US012580103B2

(12) United States Patent
Ladani et al.

(10) Patent No.: US 12,580,103 B2
(45) Date of Patent: Mar. 17, 2026

(54) BUSHING COMPRISING LOW-VISCOSITY INSULATING FLUID AND ELECTRICAL FACILITY WITH BUSHING

(71) Applicant: HITACHI ENERGY LTD, Zürich (CH)

(72) Inventors: Mital Ladani, Keshod (IN); Balakrishnan T, Bhavani (IN); Saravanan S, Vadodara (IN); Hrishikesh M, Vadodara (IN); Harshad Jadav, Junagadh (IN); Enrique Sanchez, Cordova (ES)

(73) Assignee: HITACHI ENERGY LTD, Zürich (CH)

( * ) Notice: Subject to any disclaimer, the term of this patent is extended or adjusted under 35 U.S.C. 154(b) by 188 days.

(21) Appl. No.: 18/294,182

(22) PCT Filed: Jul. 19, 2022

(86) PCT No.: PCT/EP2022/070231
§ 371 (c)(1),
(2) Date: Feb. 1, 2024

(87) PCT Pub. No.: WO2023/011912
PCT Pub. Date: Feb. 9, 2023

(65) Prior Publication Data

US 2024/0347234 A1 Oct. 17, 2024

(30) Foreign Application Priority Data

Aug. 5, 2021 (IN) ............................. 202141035354
Sep. 22, 2021 (EP) ..................................... 21198310

(51) Int. Cl.
*H01B 17/28* (2006.01)
*H01B 17/34* (2006.01)
*H01B 17/36* (2006.01)

(52) U.S. Cl.
CPC ............. *H01B 17/28* (2013.01); *H01B 17/34* (2013.01); *H01B 17/36* (2013.01)

(58) Field of Classification Search
None
See application file for complete search history.

(56) References Cited

U.S. PATENT DOCUMENTS 719,600 A * 2/1903 Moody .................. F16G 13/16 174/209
1,491,385 A * 4/1924 Faccioli ................ H01B 17/28 174/31 R
1,526,023 A * 2/1925 Steinberger ............ H01B 17/28 174/16.3

(Continued)

FOREIGN PATENT DOCUMENTS

GB 2020916 A * 11/1979 ............. H01B 17/34
WO WO-2014090677 A1 * 6/2014 ............. H01B 17/28

OTHER PUBLICATIONS

International Search Report and Written Opinion of the International Searching Authority, International Application No. PCT/EP2022/070231, mailed Oct. 18, 2022, 15 pages.

(Continued)

*Primary Examiner* — Krystal Robinson
(74) *Attorney, Agent, or Firm* — Sage Patent Group

(57) ABSTRACT

A bushing includes an insulating housing, an electrical conductor, extending through the housing and an insulating fluid in the housing, wherein the insulating fluid has a viscosity at a temperature of 100° C. of equal or less than 2 $mm^2/s$. The bushing includes a condenser body surrounding the electrical conductor, wherein the condenser body includes electrically insulating layers and electrically conductive layers, wherein the electrically insulating layers are formed from a paper impregnated with the insulating fluid.

13 Claims, 3 Drawing Sheets

(56) References Cited

U.S. PATENT DOCUMENTS

| | | | | | |
|---|---|---|---|---|---|
| 1,894,993 | A * | 1/1933 | Jansson | H01B 17/34 | 174/31 R |
| 1,899,752 | A * | 2/1933 | Estorff | H01B 17/28 | 174/31 R |
| 1,919,074 | A * | 7/1933 | Poniatoff | H01B 17/26 | 165/47 |
| 1,981,716 | A * | 11/1934 | Austin | H01B 17/28 | 174/31 R |
| 2,142,233 | A * | 1/1939 | Brandt | H01B 17/34 | 174/31 R |
| 2,188,417 | A * | 1/1940 | Rorden | H01B 17/28 | 174/31 R |
| 2,381,787 | A * | 8/1945 | Terpak | H01B 17/34 | 174/31 R |
| 3,588,319 | A * | 6/1971 | Isogal et al. | H01B 17/28 | 174/31 R |
| 3,883,680 | A * | 5/1975 | Keen, Jr. | H01F 27/04 | 174/31 R |
| 3,904,807 | A * | 9/1975 | Hildenbrand | H01B 17/34 | 174/31 R |
| 4,227,035 | A | 10/1980 | Runnels et al. | | |
| 4,362,897 | A * | 12/1982 | Matthaus | H01B 17/28 | 174/31 R |
| 5,766,517 | A | 6/1998 | Goedde et al. | | |
| 6,452,109 | B1 | 9/2002 | Koch et al. | | |
| 2010/0270875 | A1* | 10/2010 | Kabata | H02K 5/225 | 310/55 |
| 2015/0364229 | A1* | 12/2015 | Singha | H05K 7/20236 | 252/570 |
| 2020/0411208 | A1 | 12/2020 | Liu et al. | | |

OTHER PUBLICATIONS

International Preliminary Report on Patentability, International Application No. PCT/EP2022/070231, mailed Jun. 19, 2023, 15 pages.

“SF6—gas insulated outdoor bushing”, HSP, Apr. 29, 2019, XP055906886, 13 pages.

Translation of Korean Office Action, Korean Patent Application No. 10-2023-7029572, mailed Aug. 30, 2023, 4 pages.

European Office Action, European Patent Application No. 21198310.1, mailed Feb. 25, 2025, 9 pages.

* cited by examiner

BUSHING COMPRISING LOW-VISCOSITY INSULATING FLUID AND ELECTRICAL FACILITY WITH BUSHING

CROSS REFERENCE TO RELATED APPLICATIONS

This application is a 35 U.S.C. § 371 national stage application of PCT International PCT/EP2022/070231 filed on Jul. 19, 2022, which claims priority to Indian Patent Application number 202141035354, filed on Aug. 5, 2021, which claims priority to European Patent Application 21198310.1 filed on Sep. 22, 2021, the disclosures and content of which are incorporated by reference herein in their entireties.

TECHNICAL FIELD

The present disclosure relates to a bushing comprising an insulating fluid and an electrical facility with the bushing. The electrical facility may be a transformer or a switchgear, for example. The electrical facility may be a high voltage facility.

BACKGROUND

The bushing may comprise a condenser body. Such a bushing is also known as a capacitance-graded bushing. The bushing comprises a conductor, which may be a high voltage conductor. The bushing may enable the conductor to pass through a wall of an electrical facility, providing electrical insulation between the conductor and the wall. The wall may be on earth potential, for example. The condenser body may provide a uniform potential gradient of the electric field from the conductor to the wall. The condenser body comprises insulating layers comprising a paper impregnated by an insulating fluid.

Each of patent documents EP 3 576 108 A1 and EP 2 264 719 B1 discloses capacitance-graded high voltage bushings.

The internet disclosure by HSF: "SF6—gas insulated outdoor bushing for GIS substation and switches with silicone composite housing" discloses a gas-insulated outdoor bushing with a silicone composite insulator. WO 2014/090677 A1 discloses a high voltage bushing comprising a condenser core with a non-impregnatable insulating film. US 2015/0364229 A1 discloses an isoparaffin fluid acting as an electrically insulating medium functioning as a cooling medium in a transformer or bushing. US 2010/0270875 A1 discloses a high-voltage bushing in a rotating electric machine where hydrogen gas is used as a cooling medium. U.S. Pat. No. 5,766,517 A1 discloses a dielectric fluid for dissipating heat generated in a transformer. GB 2020916 A discloses a condenser bushing comprising several condenser modules separated by gaps to provide flow of a coolant.

SUMMARY

Embodiments of the disclosure relate to a bushing with improved properties, such as improved thermal performance.

According to an aspect of the disclosure, a bushing comprises an insulating housing and an electrical conductor extending through the housing. The bushing further contains an insulating fluid having low viscosity.

A low viscosity may be defined by a viscosity at a temperature of 100° C. or equal or less than 2 $mm^2/s$ (=2 cSt) As an example, the viscosity may be ultra-low being equal or less than 1.5 cST at 100° C. Alternatively, the low viscosity may be defined by a viscosity at a temperature of 40° C. being equal or lower than 6 cST, for example. As an example, the viscosity may be ultra-low being equal to or less than 4 cST at 40° C.

The fluid may be bio-degradable. As an example, the fluid may be NYTRO® BIO 300X by the company Nynas, having a viscosity of 1.4 cST at 100° C.

The bushing comprises a condenser body surrounding the electrical conductor. The condenser body comprises electrically insulating layers and electrically conductive layers, wherein the electrically insulating layers comprise a paper. The paper is impregnated by the low-viscosity insulating fluid.

The low viscosity of the insulating fluid enables an improved circulation of the insulating fluid in the bushing. Thereby, the thermal performance of the bushing can be enhanced and cooling by convection can be improved. In this way, the bushing can carry higher currents and the operation safety and the life expectancy is increased.

According to an embodiment, the electrical conductor is hollow and comprises at least one opening enabling the insulting fluid to circulate between the outside and the inside of the electrical conductor. The electrical conductor may have at least one first hole located in the vicinity of an end of the electrical conductor at which the electrical conductor is connected inside a housing of an electrical facility. The electrical conductor may have at least one second hole located at a larger distance from the first end than the first hole. The first and second holes enable circulation of the insulating fluid between the inside and the outside of the electrical conductor. Thereby, a cooling of the hotspot of the electrical conductor is improved. A hotspot may be in a region below a flange, the region being configured to be located inside a transformer tank and surrounded by oil. The hotspot may be at the first end of the bushing. Accordingly, the hotspot temperature of the conductor can be reduced.

Additionally or alternatively, the bushing may comprise a condenser body comprising a duct for enhancing circulation of the insulating fluid. As an example, the duct may be formed by a duct spacing paper comprising protruding strips. Thereby a flow channel for the fluid is provided.

According to a further aspect of the disclosure, an electrical facility comprises the bushing as disclosed in the foregoing. The electrical facility may comprise a wall in which the bushing is installed. The electrical facility may be high voltage facility. As an example, the electrical facility may be a transformer or switchgear facility.

The electrical facility may comprise a tank in which one or more electrical functional elements are located. As an example, a winding, such as a transformer winding, may be located in the tank. The tank may be filled by a further insulating fluid. The further insulating fluid may also have a low viscosity. The further insulating fluid may be the same insulating fluid as used in the bushing. It is also possible that the further insulating fluid does not have a low viscosity. The further insulating fluid may be a different insulating fluid than used in the bushing.

The electrical facility may be a transformer facility comprising one or more transformer windings. The transformer windings may comprise a further paper. The further paper may provide insulating layers located between electrically conductive layers of the windings. The further paper may be impregnated by a further insulating fluid. The further insulating fluid may also have a low viscosity. The further insulating fluid may be the same insulating fluid as used in the bushing. It is also possible that the further insulating fluid does not have a low viscosity. The further insulating fluid may be a different insulating fluid than used in the bushing. The further insulating fluid may be the same insulating fluid or a different insulating fluid than the further insulating fluid in a tank.

In this case, the entire electrical facility can carry higher current and higher temperature such that the operation safety and the life expectancy is increased.

The present disclosure comprises several aspects and embodiments. Every feature described with respect to one of the aspects and embodiments is also disclosed herein with respect to the other aspects and embodiments, even if the respective feature is not explicitly mentioned in the context of the other aspect and embodiment.

BRIEF DESCRIPTION OF THE DRAWINGS

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

DETAILED DESCRIPTION

Figure 1:
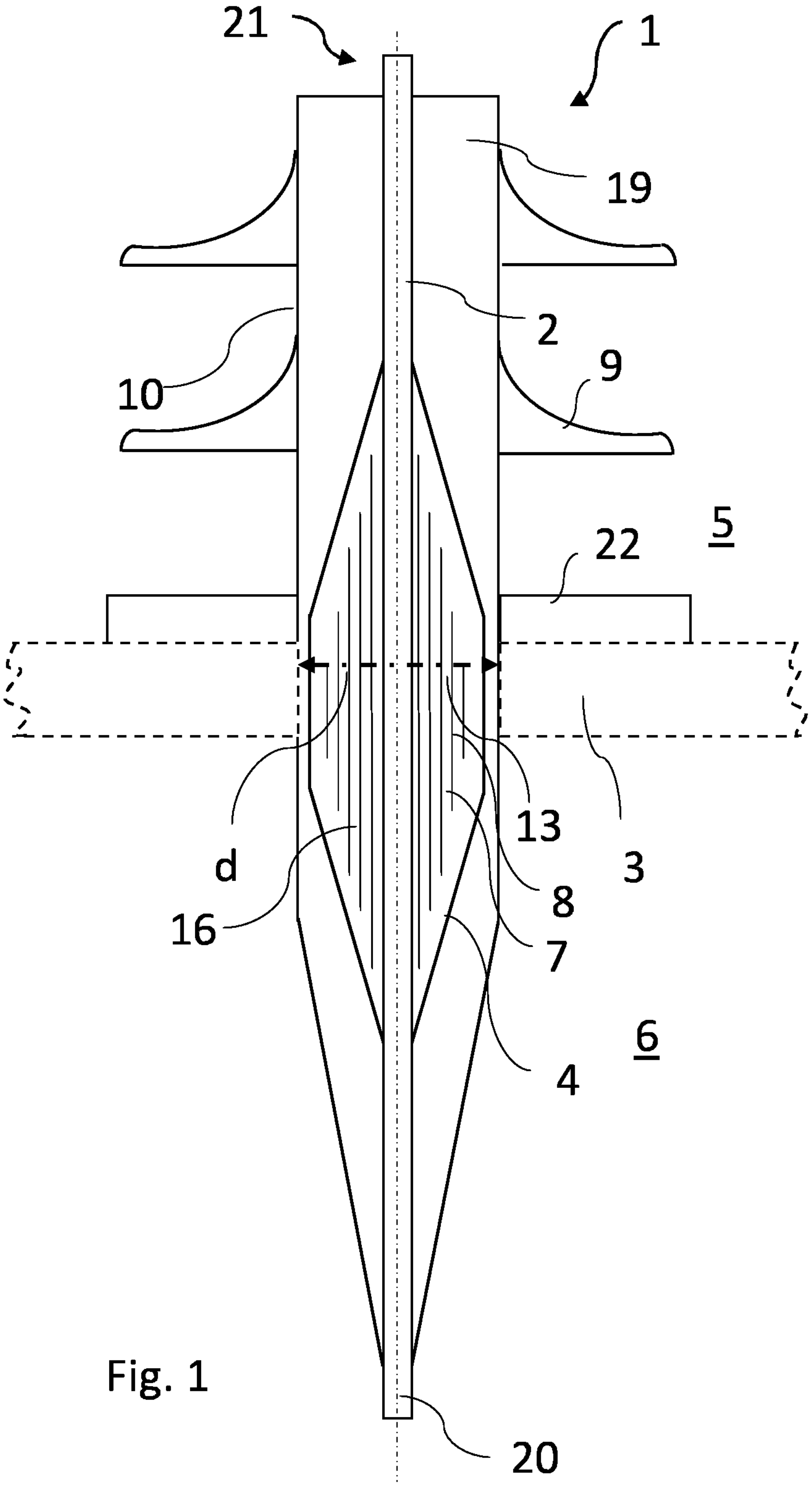
FIG. 1 is a schematic sectional view of a bushing according to an embodiment.

FIG. 1 shows a bushing 1 comprising an electrical conductor 2. The electrical conductor 2 may be hollow. The bushing 1 and conductor 2 may be suitable for high voltage applications. The bushing 1 may be used in an electrical facility such as a switching or transformer facility. The facility may be a high-voltage facility.

The bushing 1 may provide an electrical connection of the facility through a wall 3 from an outside 5 to an inside 6 of a compartment such as a tank. The wall 3 may be on earth potential or at least on an electric potential substantially different from the potential of the conductor 2. The bushing 1 provides the insulation between the wall 3 and the conductor 2. The wall 3 may be an outer wall of a transformer or switching facility, for example. The bushing 1 has a flange 22 for bearing against the wall 3.

The insulation comprises a condenser body 4 comprising insulating layers 7 of an insulating material. Electrically conductive layers 8 are located at specific positions between the insulating layers 7. The condenser body 4 can be formed by winding a foil of insulating material on which electrically conductive material is applied at specific positions.

The bushing 1 further comprises an insulating housing 10 through which the conductor 2 extends. The housing 10 comprises insulating shreds 9 for enlarging a creeping distance at an outer surface of the bushing 1. Porcelain may be used as a material providing the insulation.

The bushing 1 may be an oil-to-air type insulation, for example. In other embodiments, the bushing 1 may be an oil-to-SF6 gas type or an oil-to-oil bushing, for example.

The insulating material of the insulating layers 7 can be in the form of a paper 16, such as kraft paper, for example. The paper 16 may be plain or in the form of crepe paper. The paper 16 may be cellulose-based.

The bushing 1 comprises an insulating fluid 13. The fluid 13 may be a liquid. The insulating layers 7 may be impregnated by the insulating fluid 13. The insulating fluid 13 may fill spaces between the insulating layer 7 and conductive layers 8. In addition to that, the insulating fluid 13 may fill a reservoir 19 adjacent to the condenser body 4.

The insulating fluid 13 has a low viscosity. As an example, the insulating fluid 13 has a viscosity equal to or lower than 2 $mm^2/s$ (=2 cSt) at a temperature of 100° C. As an example, the viscosity may be 1.5 cST at 100° C. or lower. A usual temperature of the bushing 1 during operation may be between 90 and 105° C., for example. Alternatively, the low viscosity may be defined by a viscosity equal or lower than 5 CST at a temperature of 40° C., for example.

As an example, the insulating fluid 13 may be an oil. The insulating fluid 13 may be bio-based. The insulating fluid 13 may be a bio-based hydro carbon fluid. A biodegradable insulating fluid 13 is eco-friendly and allows costs for safety installations and equipment to be lowered. In this case, the bushing 1 can also be suitable for indoor applications.

As a specific example, the insulating fluid may be NYTRO® BIO 300X by the company Nynas. The viscosity of this fluid is 1.4 CST at 100° C.

For comparison, mineral oil has a viscosity of 2.5 cST at 100° C. and a viscosity of 9.6 cST at 40° C.

The low viscosity of the insulating fluid 13 enables improving circulation of the insulating fluid 13 in the bushing 1. Thereby, the thermal performance of the bushing 1 can be enhanced and cooling by convection can be improved. In operation, a hotspot of temperature of the electrical conductor 2 is at an end 20 of the electrical conductor 2 which is connected to an electrical device such as a transformer winding. The end 20 of the electrical conductor 2 corresponds to a first end of the bushing 1.

The insulating fluid 13 will flow from the first end 20 within the housing 10 in the direction of a second end 21 of the bushing 1 such that heat will be transferred from the region of the first end 20 in the direction of the second end 21 and cooling will be achieved.

Furthermore, compared to bushings of the same diameter but comprising mineral oil, the bushing 1 with the low-viscosity insulating fluid 13 has a higher current capacity, because a higher current can flow without exceeding a maximum temperature of the bushing 1. Thereby, the thermal performance during overload of the power system under fault conditions can be improved. In addition to that, the insulating fluid 13 may have a lower hotspot temperature than mineral oil. This may be required for avoiding damage to an oil-impregnated paper. This can be easier accomplished by NYTRO® BIO 300X for which the hotspot temperature can be lowered by 5° C. to 10° C. when compared to mineral oil.

Thus, the overall thermal performance of the bushing 1 can be improved. Thereby, also fire hazard during manufacturing, testing and operation is reduced. In addition to that, risk of breakage of an insulation such as a porcelain insulation is reduced.

In addition to an improved cooling performance, the low viscosity enables speeding up the impregnation time during manufacturing of the bushing 1. Impregnation may be carried out at a temperature of 60° C. Thereby, the manufacturing costs can be lowered.

In addition to that, the insulating fluid 13 may have a low pour point such that the bushing 1 is suitable for very low temperature. As an example, the pour point may be −50° C. or lower such that the bushing 1 can be operated at very low temperatures. NYTRO® BIO 300X, for example, has a pour point of −60° C.

Due to the improved thermal performance, the diameter d of the bushing can be reduced without that the overall performance is reduced.

Furthermore, the paper 16 can be thermally upgraded. A thermally upgraded paper 16 has been chemically modified to reduce the decomposition rate of the paper. Exemplarily, the modification serves to neutralize acids and reduce oxidation which may be caused by thermal degradation of the cellulose over the lifetime. Ageing effects may be reduced either by partial elimination of water forming agents (as in cyanoethylation) or by inhibiting the formation of water through the use of stabilizing agents (as in amine addition, dicyandiamide). The thermally upgraded paper may be in accordance with the standards IEC 554-3-1 and IEC 554-3-5 (DIN VDE).

The thermally upgraded paper may be treated with nitrogen. As an example, a nitrogen level in the thermally upgraded paper may be within a range of 0.5% to 5%, for example. More specifically, the nitrogen level may be in a range of 1% to 4%, for example. By the thermally upgraded paper, aging effects which may lead to a substantive loss of insulating properties can be reduced and the bushing 1 can be made safer, having a higher overload capacity.

In sum, a bushing 1 being environment-friendly, safe and having an improved electrical and thermal performance is provided. In a fault or overload condition during transformer operation, the bushing 1 with low viscosity fluid 13 can be subjected to high currents and high temperature. The bushing 1 has a high overload capability, providing safer operation with a high life expectancy.

Figure 2:
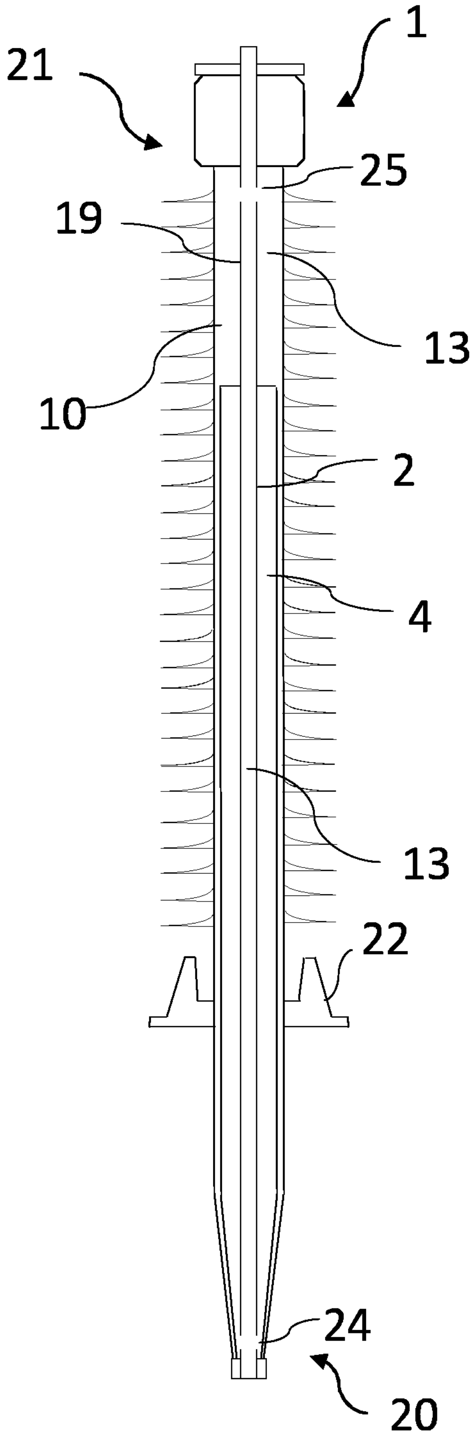
FIG. 2 is a further schematic sectional view of a bushing according to an embodiment.

FIG. 2 shows a further schematic sectional view of a bushing 1 similar to the bushing of FIG. 1, with different relative dimensions of the parts. The bushing 1 also comprises a condenser body 4 with electrically insulating layers and conductive layers which are not depicted in this figure. The bushing 1 may have the same structural and functional characteristics as the bushing 1 of FIG. 1.

In addition to that, the electrical conductor 2 has one or more first holes 24 near the first end 20 and one or more second holes 25 near the second end 21. The electrical conductor 2 is closed at the first end 20. The second holes 24 end within the reservoir 19. The first and second holes 24, 25 enable circulation of the insulating fluid 13 between an inside and an outside of the electrical conductor 2.

The insulating fluid 13 can enter the second holes 25, flow within the conductor 2 towards the first end 20, leave the conductor 2 through the first holes 24 and flow outside of the conductor 2 through the condenser body 4 or through a small space between the condenser body 4 and the housing 10 to the second holes 24 again. The circulation path can be also the other way round. The circulation is enhanced by the low viscosity of the insulating fluid 13.

With the provision of the holes 24, 25 and use of the low-viscosity insulating fluid 13, the current carrying capacity can be increased. As an example, when using NYTRO® BIO 300X, a current of more than 3000 A can flow through the bushing 1 with the temperature enabled to be kept below 80° C. For comparison, for a bushing comprising mineral oil, but being otherwise identical, the temperature is beyond 80° C. already at a current of 2500 A.

Figure 3:
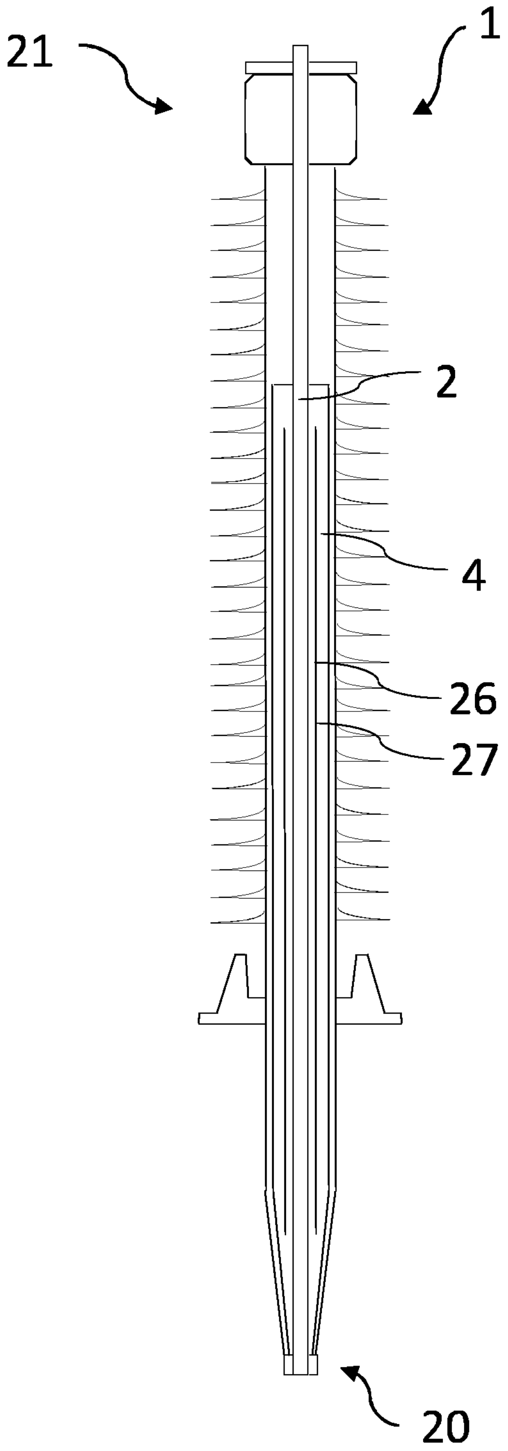
FIG. 3 is a schematic sectional view of a bushing according to a further embodiment.

FIG. 3 shows a further embodiment of a bushing 1 similar to the bushing of FIG. 2.

Figure 4:
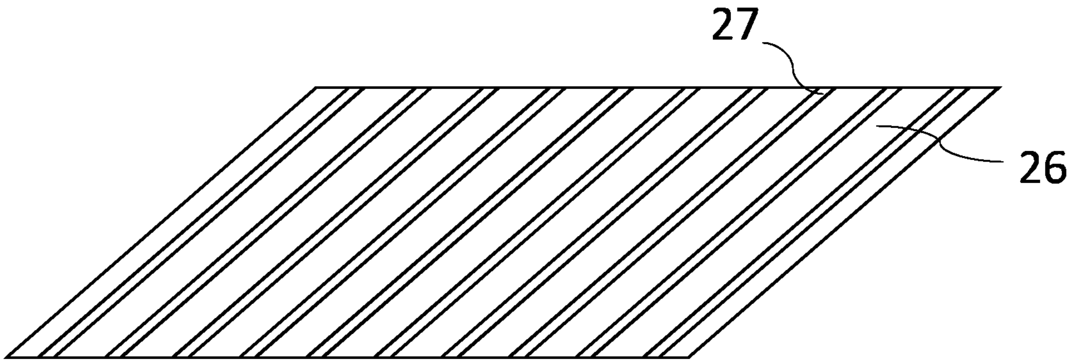
FIG. 4 is a schematic view of a duct spacing paper according to an embodiment.

The bushing 1 further comprises a duct spacing paper 26 providing a duct 27 within the condenser body 4. The duct spacing paper 26 may be formed by a transformer duct spacing paper and is shown in FIG. 4.

The duct spacing paper 26 comprises a plurality of protruding strips 27. The duct spacing paper 26 may be formed from press paper. The duct spacing paper 26 is arranged within the condenser body 4 such that the strips 27 extend in an axial direction of the bushing 1. Due to the strips 27, a flow path for the insulating fluid 13 is created within the condenser body 4 such that the circulation of the insulating fluid 13 and, thus the cooling performance can be improved. The duct spacing paper 26 may be from the manufacturer Pucaro, for example.

The duct spacing paper 26 is provided as a single layer within the other insulating layers 7 and conductive layers 8 of the condenser body 4. The duct spacing paper 26 may enclose the electrical conductor 2 in a single turn or with several turns, for example.

The electrical conductor 2 is depicted without first and second holes but it is also possible that the first and second holes are provided, allowing the fluid 13 to circulate into and out of the conductor 2.

Figure 5:
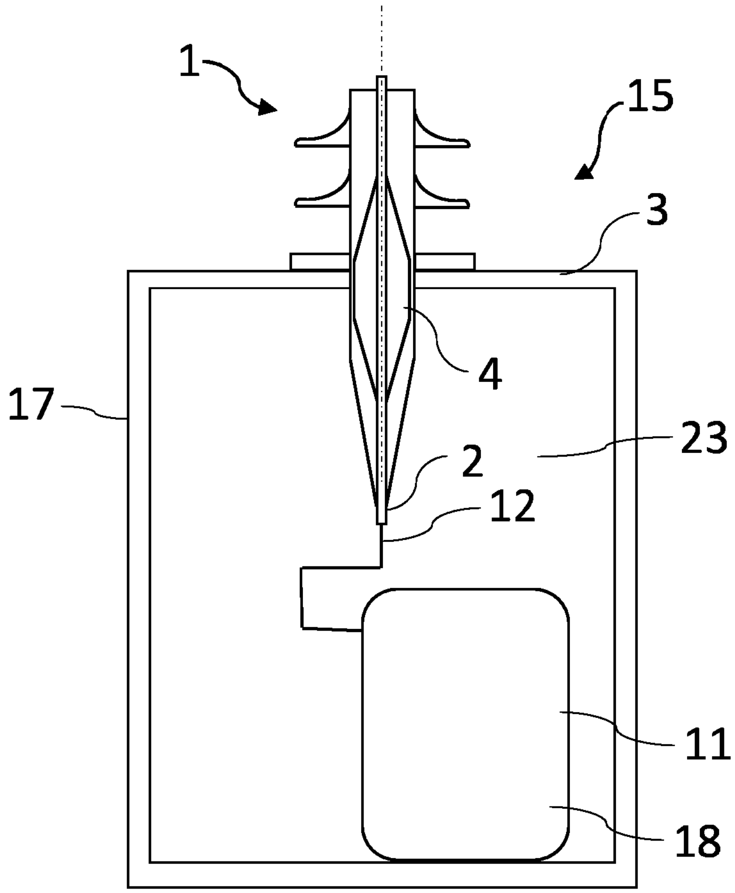
FIG. 5 is a schematic view of a transformer according to an embodiment.

FIG. 5 shows an electrical facility 15, which may be a high-voltage facility. The electrical facility 15 may be a transformer facility or a switchgear facility, for example.

The electrical facility 15 comprises a bushing 1 leading through a wall 3. The bushing 1 can be the bushing 1 of FIG. 1, 2 or 3, for example.

In the shown embodiment, the wall 3 is the wall 3 of a tank 17 in which a functional element of the electrical facility is located. The electrical facility 15 may be a transformer and the functional element may be at least one transformer winding 11. An electrical connection 12 leads from the conductor 2 to the transformer winding 11.

The tank 17 may be filled with a further insulating fluid 23. The further insulating fluid 23 may be mineral oil or ester oil. It is also possible that the further insulating fluid 23 is a fluid of low viscosity, such as NYTRO® BIO 300X. The further insulating fluid 23 may be same insulating fluid 13 as in the bushing 1.

The transformer winding 11 may comprise a further paper 18. The further paper 18 may provide insulating layers in the transformer winding 11. The further paper 18 may be impregnated with the same insulating fluid 23 as the bushing.

REFERENCE SIGNS

1 bushing
2 electrical conductor
3 wall
4 condenser body
5 outside
6 inside
7 insulating layer
8 conductive layer
9 shred
10 insulating material
11 transformer winding
12 electrical connection
13 insulating fluid
14 transformer insulation
15 electrical facility
16 paper of bushing

17 tank
18 paper of transformer winding
19 reservoir
20 end
21 second end
22 flange
23 further insulating fluid
24 first hole
25 second hole
26 duct spacing paper
27 duct
d diameter

The invention claimed is:

1. A bushing comprising:

an insulating housing, an electrical conductor, extending through the housing, an insulating fluid in the housing and a condenser body surrounding the electrical conductor, wherein the condenser body comprises electrically insulating layers and electrically conductive layers, wherein the electrically insulating layers are formed from a paper, wherein the insulating fluid has a viscosity at a temperature of 100° C. of equal or less than 2 $mm^2/s$, wherein the paper is impregnated with the insulating fluid, wherein the electrical conductor is hollow and comprises one or more holes enabling the insulating fluid to circulate between the outside and the inside of the electrical conductor.

2. The bushing of claim 1, wherein the insulating fluid is bio-degradable.

3. The bushing of claim 1, wherein the insulating fluid is a liquid.

4. The bushing of claim 1, wherein the electrical conductor has an end being configured to be electrically connected to an electrical component, wherein at least one of the holes is located near the end.

5. The bushing of claim 4, wherein the end is closed.

6. The bushing of claim 4, wherein the electrical conductor comprises at least one first hole and at least one second hole, wherein the second hole is located at a larger distance from the end than the first hole.

7. The bushing of claim 1, wherein the condenser body comprises a duct enhancing the circulation of the insulating fluid.

8. The bushing of claim 7, wherein the duct is formed by a duct spacing paper comprising protruding strips.

9. The bushing of claim 8, wherein the paper forming the electrically insulating layers is free from protruding strips.

10. An electrical facility comprising the bushing according to claim 1 and a wall in which the bushing is installed.

11. The electrical facility of claim 10, comprising a tank comprising the wall, wherein the tank is filled by a further insulating fluid, wherein the further insulating fluid is the same insulating fluid as in the bushing.

12. The electrical facility of claim 10, comprising a transformer winding comprising a further paper impregnated by a further insulating fluid, wherein the further insulating fluid is the same fluid as in the bushing.

13. The electrical facility of claim 11, wherein the further insulating fluid is a different insulating fluid than in the bushing.

* * * * *